Sept. 20, 1966     D. J. WILLEMS ET AL     3,273,657

IMPACT TOOL

Original Filed Sept. 8, 1959     7 Sheets-Sheet 1

Inventors
Henry A. Spitzley
Donald J. Willems
By Carl C. Batz
Attorney

United States Patent Office 3,273,657
Patented Sept. 20, 1966

3,273,657
IMPACT TOOL
Donald J. Willems, Omaha, Nebr. (10341 Minnick, Oak Lawn, Ill.), and Henry A. Spitzley, 564 West St., Portland, Mich.
Continuation of application Ser. No. 838,475, Sept. 8, 1959. This application Mar. 9, 1964, Ser. No. 351,277
44 Claims. (Cl. 173—121)

This is a continuation of application Serial No. 838,475, filed September 8, 1959, now abandoned. Application Serial No. 838,475 is a continuation-in-part of application Serial No. 676,530, filed August 6, 1957 and now abandoned and application Serial No. 699,774, filed November 29, 1957 and now abandoned.

This invention relates to an impact tool. This invention is particularly related to an impact tool which is triggered by the impact of a part of the tool with the object to be impacted by means of the tool. The invention is also related to a tool which is powered by fluids under pressure. The invention is also related to a pneumatic impact tool which is particularly suited to the immobilization and slaughter of animals.

It is an object of the present invention to provide an impact tool capable of delivering a heavy blow. It is a further object to provide an impact tool which is semiautomatic in its action in that it automatically resets itself for use after delivering each blow. Another object is to provide a tool which is triggered by a slight impact with the object to be dealt a blow with the full force of the tool. Another object is to provide a tool which is set upon the object to be struck and which, upon a slight impact with the object to be struck, delivers a heavy blow at the point at which it is set upon the object to be struck. It is a particular object of the invention to provide a pneumatic instrument or tool which will enable the more humane and efficient stunning and slaughter of animals. It is still another object of the invention to provide a tool for livestock immobilization which can be easily handled by the operator and which can be accurately directed to deliver blows which can be controlled in their forcefulness. It is another object to provide an impact tool which can be economically produced and operated. Further objects and advantages of the invention will be seen as the specification proceeds.

The problem of livestock immobilization has been recognized in the packing house industry for a considerable period of time. Many ways of immobilizing and stunning animals have been devised and many impact tools have been provided for this specific task.

Of the impact tools now on the market some are powered by cartridges which contain explosive charges. These instruments have the inherent disadvantages in that they must be reloaded after the delivery of each blow. It therefore requires a considerable period of time between each blow. In animal stunning, if the first blow is not effective there has been a considerable period of time during which the animal is only wounded. It is therefore desirable that a stunning tool be so constructed that it can fire rapidly as well as accurately. It is also desirable that the force of the blow delivered by the tool be adjustable according to the nature and size of the animal to be slaughtered. Thus in the slaughter of sheep and of calves, a lighter blow is required than in the slaughter of steers and heavy cattle. It is also desirable that the stunning device be efficient in its operation in order to eliminate the excitment caused animals in the stunning pens and adjacent areas. The reduction of animal excitement leads to the advantages of lessened damage to the carcasses caused by bruises during and prior to the stunning operations. The quality of the slaughtered animals is also improved by reducing the amount of blood retained in the vascular system due to the excitement incurred during conventional slaughtering operations.

The objects and advantages of the invention have been achieved in the apparatus which is described in the accompanying drawings. In the drawings.

Figure 4:
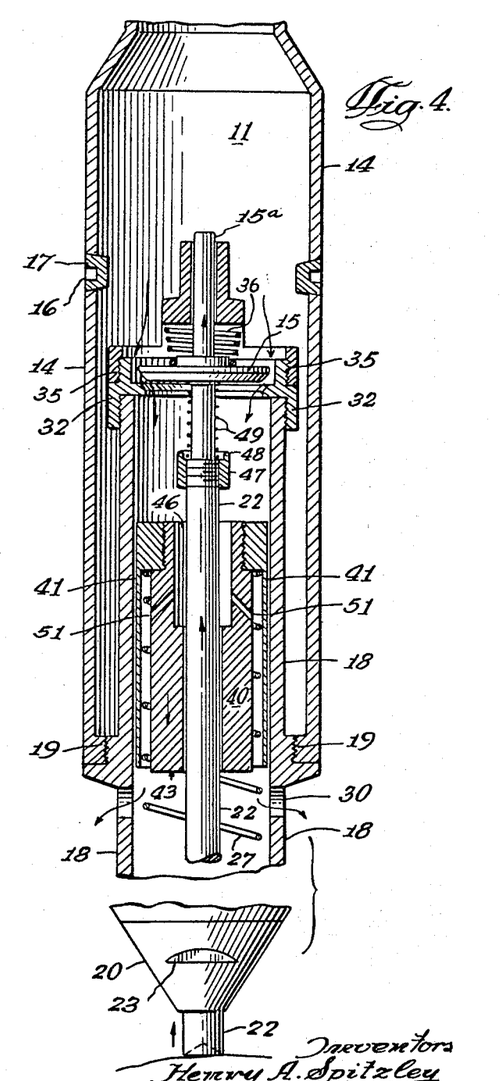
FIG. 4 is a fragmentary cross-sectional view showing the relationship of parts of the tool.
Figure 5:
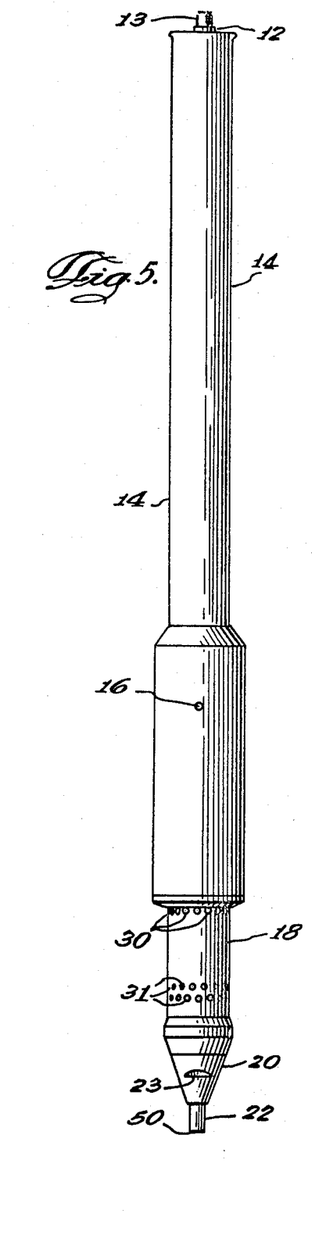
FIG. 5 is a perspective view showing the external appearance of the tool.
Figures 13, 14:
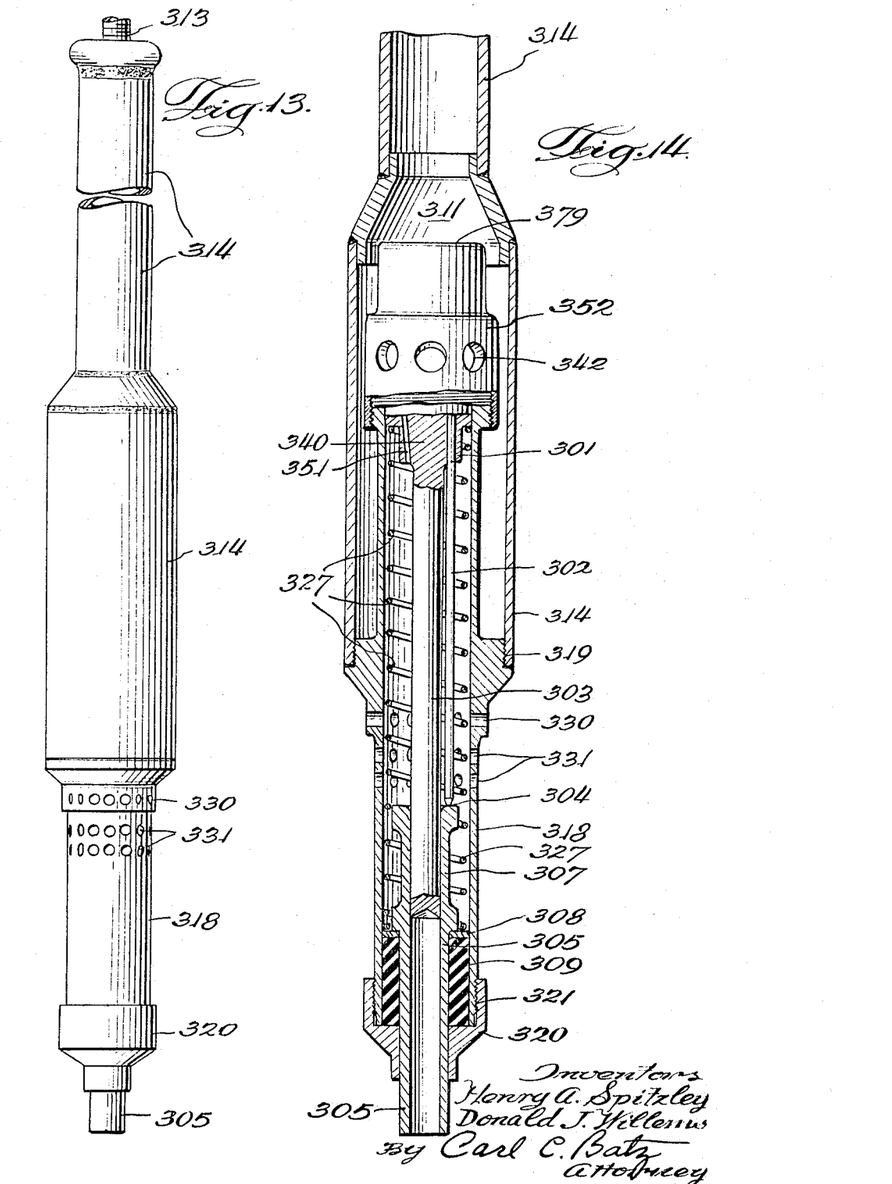
FIG. 13 is a perspective view showing the external appearance of another embodiment of the impact tool which is further illustrated in FIGS. 14 and 15.
FIG. 14 is a sectional view of the further embodiment of the impact tool showing a modified means of moving the fluid control means to an open position and another preferred valve in prespective within the tool.
Figure 15:
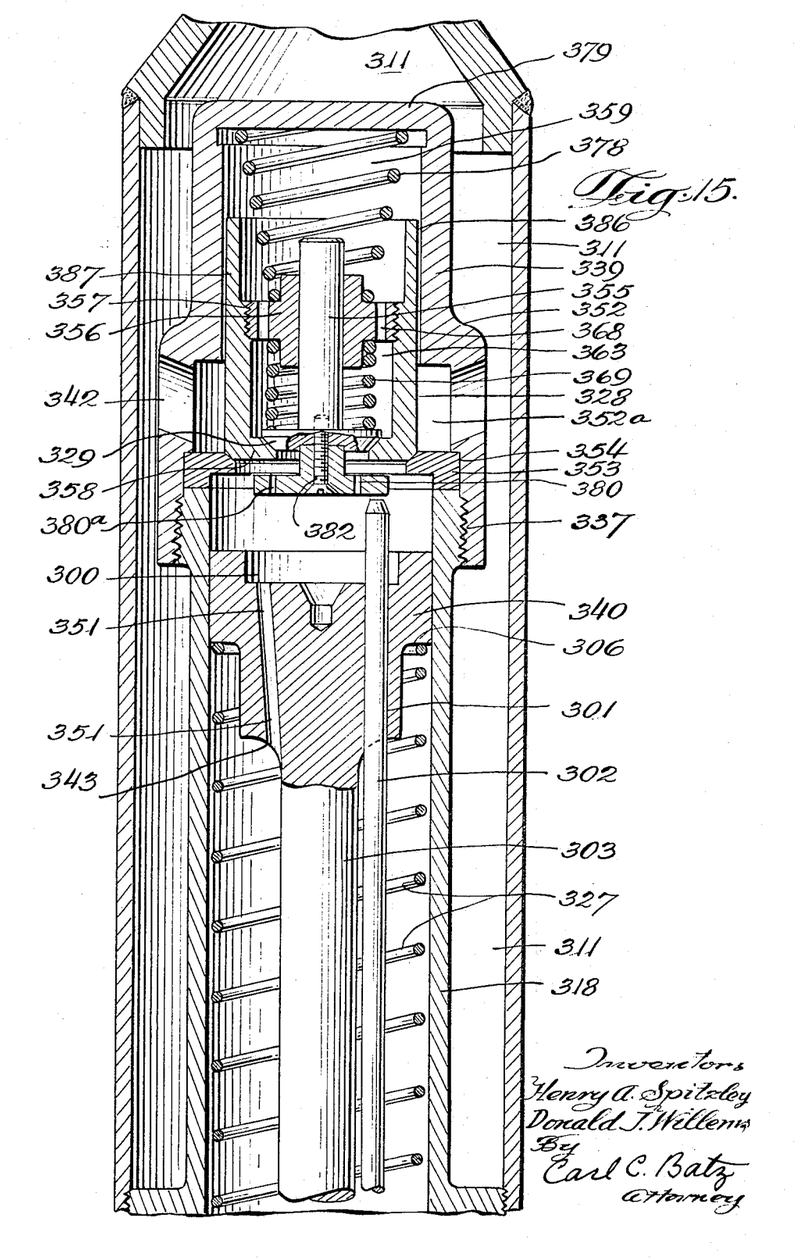
FIG. 15 is an enlarged cross-sectional view of a modified valve and trigger assembly for the tool.

The external appearance of one embodiment of the impact tool is illustrated in FIG. 5, a perspective view of the entire apparatus. A preferred embodiment of the tool is shown in FIGS. 8 to 12. A still further embodiment is shown in FIGS. 13 to 15. As shown in FIGS. 4 and 5 air is introduced into the pressure chamber 11 which is formed by the upper housing 14 through an air inlet 12 by means of an air hose 13 from any convenient source (not shown) of air under pressure. In some instances it may be desirable to use an air line lubricator (not shown) in connection with the air source to lubricate the tool. If the source of air is subject to pressure variation it is desirable to use an air pressure regulator in the air line to the tool. An air pressure regulator will also be useful to regulate the force of the blow delivered by the tool.

The pressure chamber 11, 211 and 311 as illustrated in FIGS. 4, 5, 8, 9 and 15 may be of such a shape as to provide a convenient means of handling the tool. To this end the upper or pressure chamber housing may be constricted at one end to provide a handle portion.

It is necessary that the pressure chamber be of sufficient volume so that the loss of air which occurs in the pressure chamber when the means for controlling air flow is open and air consequently rushes into the space at the head of the piston, does not drop the pressure below that pressure required to operate the tool effectively. The large volume of the pressure chamber will also make feasible the use of a small air inlet hose. We have found that the volume of the pressure chamber should be larger than the volume of the piston housing. In preferred embodiments of the invention the volume of the pressure chamber exceeds the maximum volume of the space formed (at the end of the power stroke) at the head of the piston within the piston housing. We prefer to construct the impact tool so that the ratio of the volume of the pressure chamber to the maximum space formed at the head of the piston within the piston housing is within the range of from 3 to 1 to 6 to 1.

The upper or pressure chamber cylindrical housing 14 may be provided with an indentation 16 as shown in FIG. 5 suitable for use in connection with a spanner wrench in assembling the tool. It has been found convenient in providing this identation to drill a hole in the housing and to weld a metal slug 17 in the hole, thereby permitting the provision of a notch or indentation 16 in the slug without weakening the housing 14.

The pressure chamber 11, as illustrated in FIG. 4, is formed by an upper cylindrical housing 14 which is fastened to and, in some instances, partially over the lower cylindrical housing 18 of the mechanism of the tool by means of threads 19 or by other suitable means. The guide head 20, illustrated in FIGS. 1, 3, 4 and 5, is fastened to the lower cylindrical housing by any convenient means, such as by threads 21. The guide head 20 contains an aperture through which the impact bar or pin 22 protrudes. In one form of the invention the guide head 20 may be tapered to facilitate the operator's vision of the point at which the impact pin 22 is placed. For the sake of convenience in assembling the tool the tapered guide head may be provided with notches 23 which may be gripped with a wrench. The guide head 20 is recessed to provide a recoil area 24 in which a bumper 25 made of suitable resilient material is placed. The guide head 20 can also be provided with an annular recess or notch 26 to hold the end of the recoil spring 27 in place.

The lower cylindrical housing 18 is provided with apertures, the exhaust ports 30 which are situated near the point at which the housing 18 is attached to the upper or pressure chamber housing 14. Other apertures, the escape ports 31, are situated around the circumference of the housing nearer the guide head. In the preferred form of the invention the escape ports 231 are positioned closer to the exhaust ports 230 thereby entrapping a greater quantity of air to provide increased buffering action.

Figures 1, 2, 3:
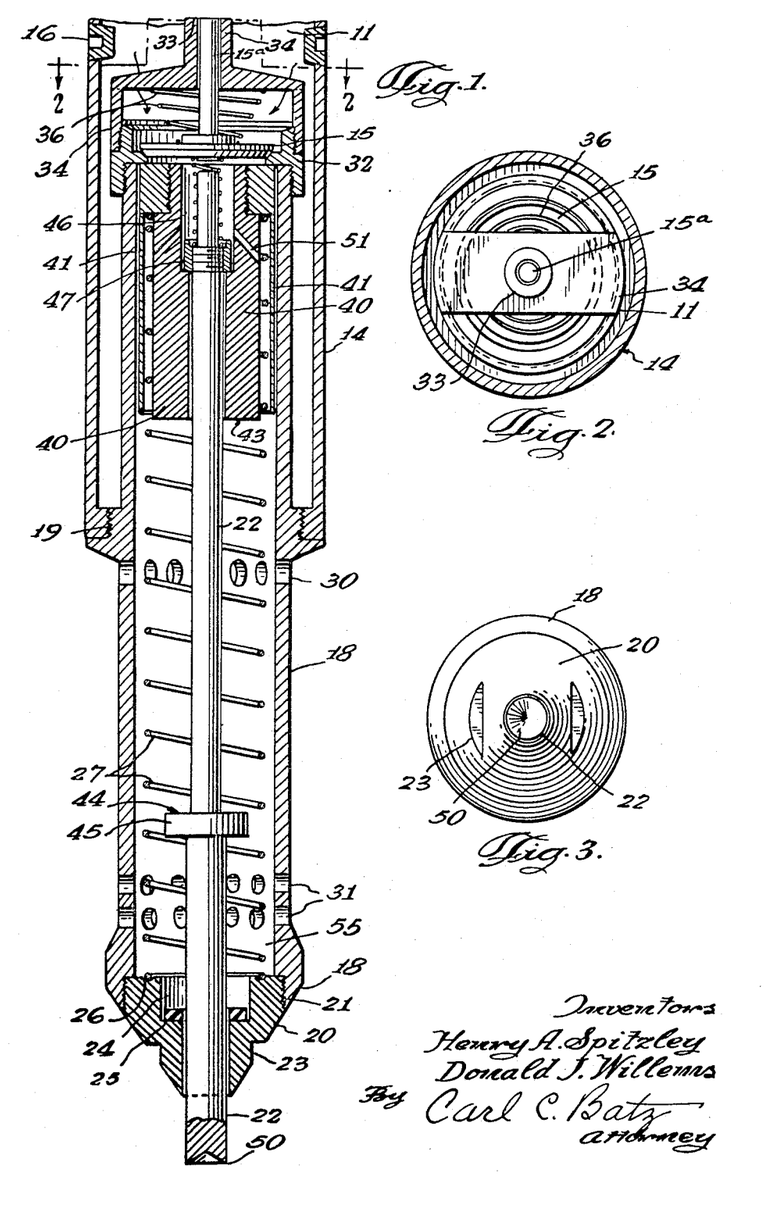
FIG. 1 is a fragmentary sectional view of the lower part of one embodiment of the impact tool taken along the axis of the tool, showing a trigger mechanism and piston of the tool.
FIG. 2 is a sectional view taken along view line 2—2 of FIG. 1.
FIG. 3 is an end view of the tool showing the end of the impact pin and the guide head.

The upper part of the lower cylinder housing 18 extends into the pressure chamber 11 and at the end of the housing within the chamber there is provided a means for controlling air flow. In the embodiment illustrated in FIGS. 1 and 4 there is provided a valve seat assembly 32 which seals the end of the housing except for the aperture into which the inlet valve 15 is fitted. Inlet valve 15 is fitted to valve seat assembly 32 and has a valve stem 15a extending into the pressure chamber 11. As shown in FIGS. 1, 2 and 4, the valve stem 15a is fitted through an aperture 33 in the valve guide and stop assembly 34 which is mounted upon the valve seat assembly by any suitable means such as by the threads 35. An inlet valve spring 36 as in FIG. 1 is fitted between the back of inlet valve 15 and the adjacent side of the inlet valve guide and stop assembly 34. The inlet valve spring is adapted to maintain the inlet valve in its seat.

It is a feature of the invention that the inlet valve 15 can be quite large, and as in FIG. 1, may be approximately the diameter of the piston. In the embodiment of the invention illustrated by FIG. 1 the valve has a diameter greater than 75% of the diameter of the piston. A valve of such a size permits the rapid entry of air to the space at the head of the piston and thereby permits the full pressure of the air in the pressure chamber to be brought to bear on the piston.

Figures 6, 7:
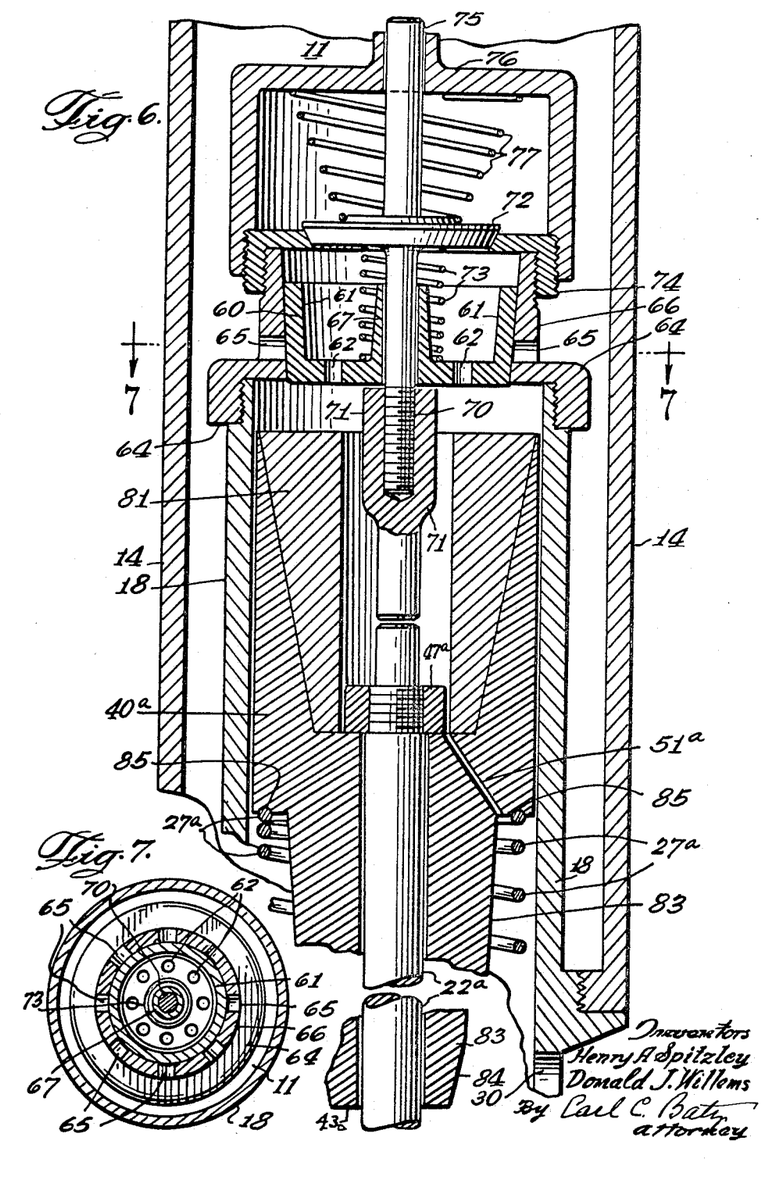
FIG. 6 is an enlarged cross-sectional view of a modified valve, trigger and piston assembly for the tool.
FIG. 7 is a sectional view of the modified valve and trigger assembly taken along view line 7—7 of FIG. 6.
Figure 8:
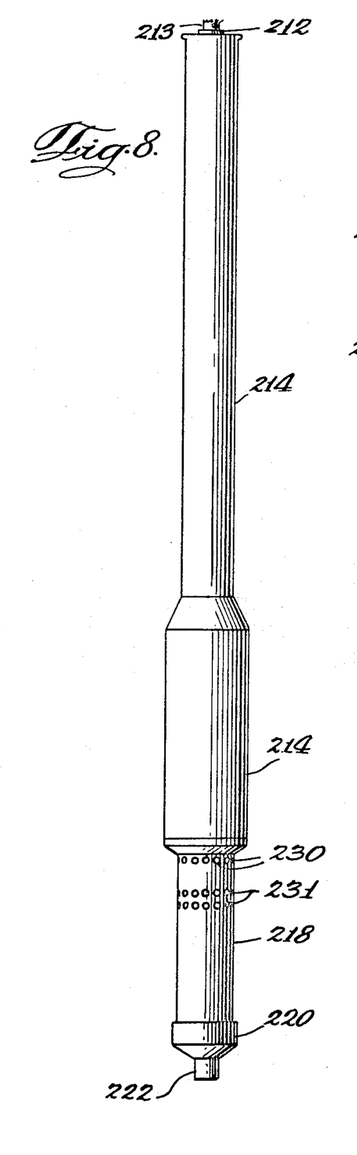
FIG. 8 is a perspective view showing the external appearance of the embodiment of the tool which is further illustrated in FIGS. 9–12.

We have found that a very desirable trigger mechanism, piston and valve assembly, closely related in its principle of operation to the embodiment described in FIGS. 1 and 4, can be made utilizing the structure of FIGS. 6 and 7. In FIG. 6 the piston housing 18, piston 40a and related parts are substantially the same as shown in the embodiment of the invention described in FIGS. 1 and 4 and have reference numerals corresponding to those used in other illustrations. In FIG. 6 the lower valve 60 is cup-shaped with side walls 61 tapering at a small angle (on the order of 4°) from the perpendicular. The base portion of the valve has several perforations 62 (FIG. 7) to permit air flow through the valve from the space just above and within the cup-shaped valve 60 to the area below the valve 60, to the space at the head of the piston. The valve 60 is mounted in a valve seat 64 having perforations 65 in the side walls 66 thereof which communicate directly with the pressure chamber 11. At the center of the valve 60 there is provided a hollow valve guide 67 having an aperture extending longitudinally therethrough to accommodate the lower extension pin 70 of the upper valve 72. The pin 70 also acts as an extension of the impact pin 22a and pin holder 71 to valve 72. The pin 70 is connected to a holder or shoulder 71 adjacent to the end of the impact pin 22a. The shoulder 71 is adapted to impinge upon and unseat valve 60 upon an upward motion such as would be caused by jolting the contact head of the impact pin against an object. Mounted upon side walls 66 in the upper valve seat 74 is a second and smaller upper inlet valve 72. Between the lower face of inlet valve 72 and the upper face of valve 60 there is a spring 73 mounted around the valve stem 67. Spring 73 is adapted to provide a force tending to hold valve 60 in closed position. The upper valve stem 75 is maintained in position by the upper valve stem guide 76 which is removably mounted upon the valve seat 74 which is in turn removably mounted on side walls 66 which are removably mounted on piston housing 18. Between the upper valve stem guide 76 and the upper side of valve 72 there is provided an upper valve spring 77 which is adapted to apply a force tending to maintain the valve 72 in closed position.

Referring particularly to the embodiment of the invention illustrated in FIGS. 1 and 4, inside the pressure chamber end of the lower cylindrical piston housing 18 there is provided a cylindrical piston guide sleeve 41 which is attached to the piston 40 and moves with the piston and is adapted to function as a guide for the piston in its travel within the housing 18 and along the impact pin or bar 22. The guide sleeve 41 also functions as a receptacle and landing for the recoil spring 27 which is fitted between the notch 26 of the guide head 20 and the sleeve 41 on the piston 40. In the modification of the apparatus illustrated in FIGS. 6 and 7 the piston guide sleeve 41 of FIGS. 1 and 4 is omitted and the recoil spring 27a is enlarged and guided on the inside wall of the piston housing 18. In this modification the recoil spring 27a is positioned on the piston 40a by means of an annular groove 85 or other suitable means. The piston 40a is guided in its motion by the inside of the housing 18 and its own periphery. The lower end 83 of the piston 40a is of lesser diameter to accommodate the recoil spring 27a. The lower end 83 of the piston 40a may also be provided with a tapered portion 84 to facilitate action of the recoil spring. In order to reduce the weight of the piston 40a, the upper central portion may be removed and replaced with a lighter material such as the aluminum insert 81 which contains an aperture to accommodate the impact pin 22a, shoulder 47a and the holder 71. The piston 40, or 40a in the embodiment of FIG. 6, is movably mounted within the cylindrical housing and is provided with an aperture through which the shaft of the impact bar or pin 22 or 22a is passed. Thus the shaft of the impact pin serves also as a guide for the piston assembly. At its lower end the piston described in FIGS. 1 and 4 has a surface 43 adapted, on forward or downward motion, to strike the surface 44 of the impact shoulder 45 of the impact pin. The piston at the end adjacent to the inlet valve is provided with a recess area 46 larger than the cross-sectional area of the impact pin. The recess area 46 accommodates the trigger pin shoulder 47 which is adjustably affixed to the impact pin 22 and which may be provided with a small collar 48 to accommodate the trigger spring 49. A trigger spring 49 is placed upon the trigger spring shoulder 47 or into the collar 48 so as to provide a force against the face of inlet valve 15 when the impact pin, and therefore the shoulder 47, is moved toward the valve by reason of impact of the end or contact head 50 of the impact pin 22 with the object to be struck.

In its return stroke the piston compresses air between itself and the face of the inlet valve. Therefore, to exhaust this undesirable back pressure, one or several exhaust channels 51 extend from the recess area 46 through the piston to the area within the guide sleeve 41 in the apparatus of FIGS. 1 and 4, to the area between the piston 40a and the housing 18 in the apparatus of FIG. 6, or to the area between the piston 240 and the housing 218 in the apparatus of FIG. 8.

In the operation of the apparatus, air under pressure is admitted to the pressure chamber 11 through air hose 13 and inlet 12.

Air pressures on the order of from 160 to 200 pounds per square inch are satisfactory in the stunning of heavy cattle. For other uses and for stunning lighter animals a lower air pressure may be used. The air pressure (as indicated above) may be regulated to the desired pressure by any suitable means such as by an air line pressure regulator or by connection to a source of air under a constant pressure. The operator then taps the impact pin 22 on the point at which the blow is desired. This point in the ordinary case of animal stunning operations will be a point at the top of the animal's head immediately behind the horn boss, or upon the frontal skull between the eyes and ears, or on the back of the animal's neck at juncture of the skull and vertebrae. When tapped against an object the impact pin transmits the comparatively light force of the blow through the length of the pin to the face of the inlet valve 15 and jolts the valve slightly open. Once the inlet valve 15 is jolted open to a slight degree, the air under pressure in the pressure chamber 11 rushes into the space at the head of the piston 40. Also, as the impact pin 22 is abruptly moved against the inlet valve 15 by the tap on the object, the trigger spring shoulder 47 which is affixed to or a part of the impact pin 22, is moved toward the inlet valve 15 thus compressing the trigger spring 49. As the air pressure in the space at the head of the piston approaches the air pressure in pressure chamber 11, the force exerted on the valve by the trigger spring 49 is enabled to throw the inlet valve 15 wide open and thereby to permit the full air pressure to be brought to bear upon the piston 40 and thereby to cause the piston to be driven downward along the impact pin 22 to the impact shoulder 45. As the piston 40 is driven in its power stroke toward the impact shoulder and beyond the position of the shoulder to the position of the escape ports 31, air entrapped ahead of the piston is exhausted through escape ports 31; simultaneously, as the piston drives forward in the power stroke, the trigger spring shoulder moves away from the inlet valve 15, tension on the trigger spring 49 is relieved and the inlet valve 15 is urged downward by the inlet valve closing spring 36 and is reseated thus sealing the pressure chamber 11 from the space at the head of the piston 40. The pressure driving the piston 40 in its power stroke is exhausted through exhaust ports 30 after the impact of the piston upon the impact shoulder 45 and after the piston 40 has passed the exhaust ports 30. The exhaust ports are not available to relieve the driving air until the piston has delivered its momentum to the impact pin 22 by impact with the impact shoulder 45.

The forward momentum of the piston in its driving stroke is largely absorbed by the impact with the impact shoulder and the subsequent impact of the impact pin with the target. The forward momentum not absorbed by the target is buffered by the entrapped air in the buffer space which is at the end of the cylinder beyond the escape ports. Additional forward momentum of the piston and of the impact pin is absorbed by the entrapped air in the recoil area 24 into which the impact shoulder is carried at the end of its stroke. Any remaining momentum is dissipated through the bumpers 25 or 225 which may be made of any suitable material such as neoprene, etc., and which are placed at the end of the recoil area at the extreme end of the forward motion of the impact shoulder.

As the piston moves forward the recoil spring 27 or 227 is compressed and at the end of the forward motion of the piston and impact pin, the recoil spring and the compressed air in the recoil area and buffer space cooperate to urge the piston and impact shoulder to return to the starting position. As the piston returns to starting position the air entrapped between the means for controlling air flow (e.g. the valve 15) and the piston is exhausted through air escape channels 51 or 251 to the space below the piston, the air in that space being at atmospheric pressure by reason of ports 30 and 31 or 230 and 231.

In the operation of the trigger assembly of FIGS. 6 and 7, the contact head (not shown in FIG. 6) of the impact pin 22a of the tool is jolted against an object and a force is thereby transmitted by the upward motion to the holder 71 to the pin 70 and the upper valve 72 which is thereby opened slightly. Simultaneously the shoulder 71 strikes the bottom of valve 60 moving it slightly upward and air rushing in through perforations 65 forces the valve 60 further upwards whereupon the stem 67 forces valve 72 upwards to a wide open position. At this point the air in pressure chamber 11 may freely pass through open valve 72 into the space over valve 60 and thence through the perforations 62 in valve 60 to drive the piston 40a. Air also is then permitted to pass through perforation 65 from the pressure chamber 11 directly to the space at the head of the piston 40a. As the piston and impact bar or pin 22a move downward the upper valve spring 77 forces valve 72 to a closed position. Valve 72 in turn acts upon spring 73 to force valve 60 to a closed position, thus completing the valve operation. At the end of the piston stroke, the piston is returned as described above in connection with other modifications of the apparatus.

A preferred form of the invention is illustrated in FIG. 8 through FIG. 12 wherein the reference numerals in a 200 series correspond to those numerals designating corresponding parts of other forms of the invention.

In this embodiment of the invention the means for controlling air flow (or flow of other fluids under pressure) from the pressure chamber 211 to the piston housing 218, utilizes the valve assembly illustrated in FIGS. 9, 10, 11 and 12, comprising dual valves (an upper valve 290 and a lower valve 291) which are means for sealing two paths of air flow from the pressure side of the valves to the space beyond the valves, i.e. to the space within the piston housing 218 at the head of the piston 240. This particular valve assembly can be mounted on the piston housing 219 and within the pressure chamber by means of threads or other suitable means.

Figure 9:
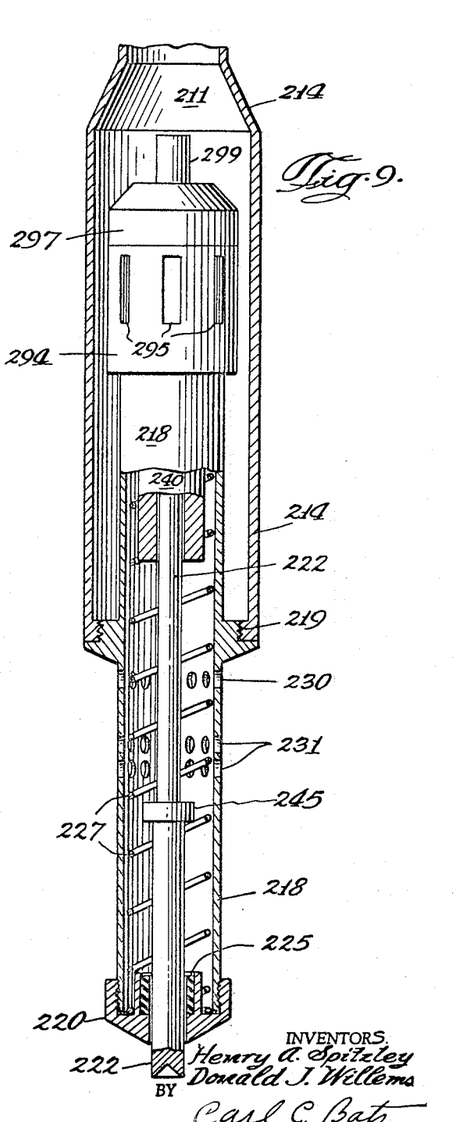
FIG. 9 is a fragmentary sectional view of an embodiment of the impact tool showing the preferred valve in perspective within the tool.
Figures 10, 11, 12:
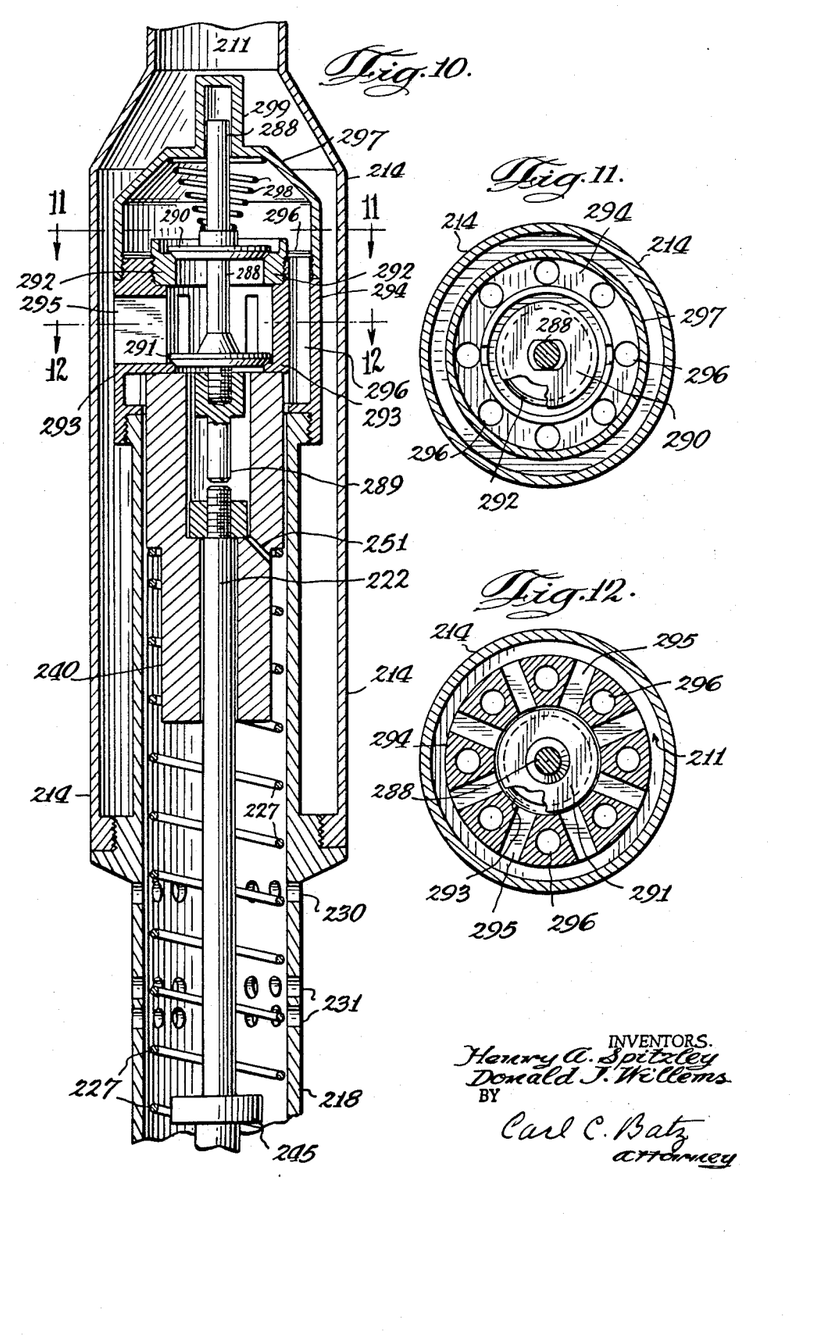
FIG. 10 is a fragmentary sectional view of the lower part of the preferred embodiment of the impact tool.
FIG. 11 is a cross-sectional view of the valve assembly taken on view line 11—11 of FIG. 10.
FIG. 12 is a cross-sectional view of the valve assembly taken on view line 12—12 of FIG. 10.

As illustrated in FIG. 10 the upper valve 290 and the lower valve 291 can have a common valve stem 288 which has a lower extension 289 adjacent to the upper part of the impact bar 222. The upper valve seat 292 with the associated upper valve 290 and the lower valve seat 293 with the associated lower valve 291 together with the relatively thick cylindrical valve cage walls 294 enclose a space between the valves which, by reason of the perforations 295 in the walls 294, is in open and free communication with the pressure chamber 211. Referring to FIG. 12 it will be seen that the substantially vertical cage walls 294 contain circumferentially placed apertures 296 between the perforations 295. The apertures 296 extend from the space over the upper valve 290 to the space within the piston housing 218 at the head of the piston, the air receiving space, and therefore facilitate the direct, free and rapid flow of air to the space at the head of the piston from the area over the upper valve 290. As seen in FIGS. 9 and 10 the upper valve 290 taken with the upper valve seat assembly 292 and the cover 297 completely encloses the space over the upper valve except for the aforementioned air passages or apertures 296. Over the upper valve 290 and on the cover 297 there desirably can be provided means for guiding the valve such as valve stem guide 299. The valve stem guide 299 is so constructed that it will not permit air flow between the space beneath the cover 297 and the pressure chamber 211 in which the entire valve assembly is situated. Between the upper surface of the upper valve 290 and the cover 297 there can be placed means tending to urge the valves 290 and 291 to a closed position; such means in the embodiment of FIG. 10 is the spring 298. Other means tending to urge the valves to closed position may be improvised and otherwise situated in the valve assembly.

The space within the valve cage, i.e. the space enclosed by the valves and means for mounting the valves, is in open and free communication with the pressure chamber by means of the perforations 295 and therefore air within the valve cage exerts a force on the lower valve 291 tending to keep that valve in closed position. The air also exerts a force on the lower face of the upper valve 290 tending to open that valve. The valves are fixed in relation to each other by means of the valve stem 288. The area of each of the valves can be so adjusted that the sum of the forces tending to open and close the valve is nearly zero. The valves therefore can be adjusted (by adjusting the area of each) so that the combination of valves is very easily triggered by a very slight impact, or if desired is only triggered by a heavy impact.

In operation, this valve, as in other illustrated embodiments, is triggered by jolting the impact bar 222 against an object; the impact bar 222 in turn hits the lower extension 289 of the valve stem and thereby jolts both lower valve 291 and upper valve 290 open (see FIG. 10). Air within the valve cage walls 294 then rushes through lower valve seat 293 to the space at the head of the piston. Simultaneously air impinges on the lower face of upper valve 290 and rushes through upper valve seat 292 into the space beneath cover 297 and thence downward through air passages or apertures 296 to the space at the head of the piston. Pressure in the space at the head of the piston is quickly built up and drives the piston in its power stroke. As the pressure in the piston housing approaches that of the pressure chamber, the piston moves downward in its power stroke and carries the impact bar out of contact with the valve stem and permits the spring 298 or similar means tending to urge the valves to closed position to close the valves. The operation of the valve assembly is therefore rapid and the valve is automatically reset after each impact. In this embodiment of the invention it has been found desirable to place the escape ports 231 close to the exhaust ports 230, and thereby increase the volume of the space at the head of the tool wherein air is entrapped and compressed on the power stroke. The entrapped air provides a means for absorbing the energy of the piston which is not delivered by the impact pin to the object impacted by the tool.

As seen above the apparatus is automatically reset after each firing. The action is rapid, enabling successive blows to be delivered with great rapidity, being limited only by the operator's ability to repeatedly tap the impact pin against the target. We have found that for the stunning of heavy or aged cattle an air pressure of from 160 to 200 pounds per square inch is desirable. Reduced air pressures are advisable for lighter cattle or smaller species of animals. The force of the blow delivered by the tool may also be regulated by adjusting the ratio of the weight of the piston to the weight of the pin. For use in cattle stunning we have found that a ratio of 14 ounces to 6 ounces can be used with good results.

A still further embodiment of the tool is illustrated in FIGS. 13 through 15 wherein the reference numerals in a 300 series correspond to those numerals designating corresponding parts of other forms of the invention.

In this embodiment of the invention the means for controlling air flow (or flow of other fluids under pressure) from the pressure chamber 311 to the piston housing 318 utilizes the valve assembly as clearly shown in FIG. 15. This valve assembly includes a main valve 328 and an auxiliary or relief valve 329, which are means for sealing a path of air flow from the pressure side of the valves to the space at the head of the piston 340. This valve assembly can be mounted on the piston housing 318 and within the pressure chamber by means of threads 337 or other suitable means.

As illustrated in FIGS. 14 and 15, means are provided for mounting the means for controlling air flow within the pressure chamber and above the piston housing. Such means include a valve housing 352 having walls 339 containing circumferentially spaced perforations 342. These perforations provide free and open communication from the pressure chamber 311 to the area 352a immediately surrounding the valve assembly.

Main valve 328 is of general cylindrical shape and is slidably mounted within the substantially vertical, relatively thick valve cage or valve housing 352. A valve seat assembly 353 is provided and is adapted to receive the main valve 328 and thereby seal off the path of air flow from the pressure side of the main valve to the space at the head of the piston. As it is shown in FIG. 15, this valve seat assembly is positioned above the end of cylinder housing 318 and is fitted into a recess 354 in the valve housing 352.

Positioned within the main valve 328 is a relief valve 329, with its valve stem 355 slidably mounted in a relief valve guide 356. Relief valve guide 356 is mounted within the main valve by means of threads 357 or other suitable means. The main valve 328 is so constructed as to provide a valve seat 358 for the relief valve 329. In the particular embodiment shown in FIG. 15, the relief valve guide assembly is so constructed that it permits air flow between the enclosed area 359 and area 363. A series of apertures 368 permit such air flow. Mounted between the upper surface of relief valve 329 and the relief valve guide are means tending to urge the relief valve to a closed position; such means in the embodiment of FIG. 15 is the spring 369. Means are also provided which tend to urge the main valve 328 to a closed position. As shown in FIG. 15, such means is the spring 378, which is positioned between the cover 379 of the valve housing and relief valve guide 356.

Attached to the lower portion of the relief valve is an extension 380. This extension is attached to the relief valve by means of bolt 382 having a countersunk head, or other suitable means. It is desirable to provide extension 380 with apertures 380a which permit air to escape from areas 359 and 363 into the space at the head of piston 340 when the extension makes contact with main valve 328.

It is a feature of this embodiment of the invention that the valve assembly be so constructed that air or other fluid under pressure will be able to pass from the pressure chamber 311 through a restricted passage to an enclosed area 359 or chamber above the main valve. With such a construction, pressure will build up behind the main valve, locking this valve in a closed position. As shown in FIG. 15, a space 386 is provided between the sides 387 of the main valve and the walls 339 of the valve housing 352. When triggering pressure on the valve assembly is released, air under pressure will pass from the pressure chamber to the enclosed areas 359 and 363, exerting a force on the main valve locking this valve in a closed position. This air under pressure also exerts a force on relief valve 329, locking it in a closed position against valve seat 358. As previously pointed out, means are provided for urging the main valve, and its associated relief valve, to a closed position.

It will be appreciated by those skilled in the art that other means of building up air pressure behind the main valve can be suitably devised. The important feature being that air pressure be allowed to build up behind the main valve, with means for rapidly reducing this pressure prior to opening the main valve.

Referring again to FIGS. 14 and 15, the piston 340 is movably mounted within the cylindrical housing 318 and is provided with an aperture 301 through which a trigger rod 302 is passed. The head of piston 340 is recessed to form an area 300 which accommodates extension 380. The piston together with the plunger 303 or impact bar is so constructed as to form a single unit. At its lower end, the piston 340 has a surface 343 adapted, on forward or downward motion, to strike the surface 304 of the trigger tube 305. Piston 340 is also provided with a surface 306 adapted to function as a receptacle and landing for the recoil or recycling spring 327. The piston 340 is also provided with aperture 351 for venting to the atmosphere the area between the valve assembly and the top of the piston on the return stroke of the piston. In its return stroke the piston compresses air between itself and the face of the valve assembly. Therefore to exhaust the undesirable back pressure, one or several exhaust channels or apertures 351 extend from the recessed area 343 through the piston to the area below the valve assembly.

At its upper end, the trigger tube 305 is provided with a spool-shaped impact collar 307. This trigger tube with its impact collar is movably mounted within the cylinder housing 318 and guide head 320 and surrounds the plunger 303. It will be seen that the upper portion of the trigger tube is of less diameter than cylinder housing 318 so as to provide an area for the recycling spring 327.

Beneath the lower portion of the spool shaped impact collar 307 and surrounding the trigger tube is a cylindrical shaped metal washer 308 together with a bumper 309. This washer and bumper provide a means for absorbing part of the impact delivered to the trigger tube on the forward or downward movement of the piston 340.

Positioned above the top of trigger tube 305 and parallel to the plunger 303, is trigger rod 302. The position of the lower end of the trigger rod 302 is most clearly shown in FIG. 14 and the upper end of the trigger rod is shown most clearly in FIG. 15. It will be seen from these figures that the piston 340 is provided with an aperture 301 through which the trigger rod is passed. It will also be seen that there is a clearance between the upper end of the trigger rod and the relief valve extension 380 when the tool is in the rest position. This trigger rod serves to transmit the force applied to the trigger tube when the operator taps the trigger tube on the point at which the blow is desired. This force is transmitted by the trigger rod to the extension 380 of relief valve 329, and throws this valve open, thereafter throwing the main valve 328 to an open position.

In operation, the valve assembly including main valve 328 and relief valve 329 is triggered by jolting the trigger tube 305 against an object; surface 304 of the trigger tube 305 in turn strikes the lower portion of trigger rod 302, which in turn makes contact with extension 380 throwing the relief valve slightly open. Once the relief valve has been opened, the pressure which has built up in the areas 359 and 363 is quickly reduced permitting the main valve to be opened with considerably less force. It will be noted that the force exerted by the trigger rod not only opens the relief valve, but also serves to open the main valve. Once the main valve is thrown open, the air under pressure in the pressure chamber 311 rushes into the space at the head of the piston 340. As the air pressure in the space at the head of the piston approaches the air pressure in pressure chamber 311, the piston is driven in its power stroke towards the trigger tube 305. As the piston is driven forward in its power stroke, air entrapped ahead of the piston is exhausted through escape ports 330.

The forward momentum of the piston in its driving stroke is largely absorbed by impact of the plunger 303 with the target and by impact of the piston with the trigger tube. That forward momentum not absorbed by the target is buffered by the entrapped air in the buffer space which is at the end of the cylinder beyond the escape ports. Additional forward momentum of the piston and of its associated plunger is dissipated by the recoil spring 327 and through the bumper 309 which may be made of any suitable impact absorbing material such as Neoprene, etc., which is placed beneath the spool shaped impact collar 307 of the trigger tube.

As the piston moves forward the recycling spring is compressed and at the end of the forward motion of the piston and plunger, this spring and the compressed air in the recoil area and buffer space cooperate to urge the piston to return to the starting or rest position shown in FIG. 15. As the piston returns to the starting position the air entrapped between the means for controlling air flow (that is the valve assembly) and the piston is exhausted through air escape channel 351 to the space below the piston, the air in that space being at atmospheric pressure by reason of ports 330 and 331.

It should be noted that when the lower surface 343 of the piston strikes the spool-shaped collar of trigger tube 305 the trigger tube is urged to its downmost position and correspondingly the trigger rod 302 moved away from the face of the extension 380 permitting both the relief valve and the main valve to close, cutting off the supply of air from the pressure chamber 311. Springs 369 and 378 tend to urge the main valve 328 and relief valve 329 to a closed position. In addition, when both valves are in a closed position, pressure will again build up in the areas 359 and 363, such air pressure delivering a force which locks both valves in the closed position.

As has been seen in the other embodiments of this tool, the apparatus is automatically reset after each firing. The action is rapid, enabling successive blows to be delivered with great rapidity, being limited only by the operator's ability to repeatedly tap the trigger tube against the target.

It will also be appreciated that the various embodiments of this tool are interchangeable. For example, the fluid control means as illustrated in FIGS. 13 through 15 can be readily adapted to other embodiments of the tool previously described. Correspondingly, the previously described means for moving the control means to an open position may be adapted to open the control means illustrated in FIGS. 13 through 15.

It is also readily apparent that the invention illustrated by the accompanying drawings in the foregoing discussion is susceptible to many variations and modifications, all of which are within the spirit and scope of the invention, and it is therefore to be understood that the claims are intended to comprehend all such variations and modifications.

Having thus described this invention, there is claimed as new and desired to be secured by Letters Patent:

1. A pneumatic impact tool comprising pressure chamber, means for introducing air into said pressure chamber, a piston, a piston housing communicating with said pressure chamber, an air inlet valve seat at one end of said piston housing, an air inlet valve between said pressure chamber and said piston housing, said air inlet valve being adapted to fit into said air inlet valve seat and thereby control the air flow between said pressure chamber and said piston housing, an air inlet valve guide and valve spring mount assembly mounted in said pressure chamber and upon said piston housing, a guide head closing the end of said piston housing opposite said air inlet valve seat, said piston housing being provided with apertures whereby air entrapped in said piston housing before said piston in its forward power stroke is exhausted and being provided also with apertures in said piston housing whereby air driving said piston in its power stroke is exhausted after the power stroke is completed, an impact pin having an impact shoulder and trigger shoulder thereon, said impact pin being slidably mounted in said piston housing and protruding through an aperture in both said guide head and said piston, said impact pin being positioned within said piston housing by means of said guide head and said piston, said impact shoulder being adapted to transmit the momentum of said piston in its power stroke to said impact pin, said piston being slidably mounted on said impact pin within said piston housing, said impact pin in normal position having one end proximate to the face of said air inlet valve whereby force is transmitted to said air inlet valve when the opposite end of said impact pin is jolted against an object and thereby is moved in said piston housing toward said air inlet valve, an inlet valve spring adapted to apply a force which tends to hold said air inlet valve in closed position, a trigger spring positioned between the face of said air inlet valve and said trigger shoulder, said trigger spring being adapted to apply a force tending to open said air inlet valve when said impact bar and trigger shoulder is moved toward said air inlet valve, and a recoil spring positioned between said piston and said guide head so as to be compressed on the power stroke of said piston, said recoil spring being adapted to urge said piston to its normal starting position after its power stroke.

2. A pneumatic impact tool comprising a pressure chamber, means for introducing air into said pressure chamber, a piston housing, means for mounting said piston housing in communicating relationship with said pressure chamber, a piston slidably mounted within said piston housing, said piston having an aperture extending longitudinally therethrough, an air inlet valve seat at the end of said piston housing which communicates with said pressure chamber, an air inlet valve between said pressure chamber and said piston housing, said air inlet valve being adapted to fit into said air inlet valve seat and thereby control the air flow between said pressure chamber and said piston housing, a guide head closing the end of said piston housing opposite said air inlet valve seat, said piston housing being provided with apertures whereby air entrapped in said piston housing before said piston in its forward power stroke is exhausted and being provided also with apertures in said piston housing whereby air driving said piston in its power stroke is exhausted after the power stroke is completed, an impact bar extending from a position adjacent to the face of said air inlet valve through said aperture in said piston along the longitudinal axis of said piston and through and to the outside of said guide head whereby force is transmitted to said air inlet valve when the opposite end of said impact bar is jolted against an object and thereby is moved in said piston housing toward said air inlet valve, said impact bar being positioned within said piston housing by means of said guide head and said piston, said piston being slidably mounted on said impact bar within said piston housing, an impact shoulder on said impact bar, said impact shoulder being adapted to be struck by said piston in its power stroke and thereby to transfer the momentum of said piston to said impact bar, a trigger shoulder mounted on said impact bar near said air inlet valve, a trigger spring positioned between the face of said air inlet valve and said trigger shoulder, said trigger spring being adapted to apply force tending to open said air inlet valve when said impact bar and said trigger shoulder are moved toward said air inlet valve, an air inlet valve spring adapted to apply force which tends to hold said air inlet valve in closed position, and a recoil spring positioned between said piston and said guide head so as to be compressed on the power stroke of said piston, said recoil spring being adapted to urge said piston to its normal starting position after its power stroke.

3. Apparatus according to claim 2 wherein said air inlet valve is of approximately as great a diameter as said piston.

4. Apparatus according to claim 2 wherein the diameter of said air inlet valve is at least 75% of the diameter of said piston.

5. Apparatus according to claim 2 wherein the volume of said pressure chamber is greater than the volume of said piston housing.

6. Apparatus according to claim 2 wherein the ratio of the weight of said piston to the weight of said impact bar and elements affixed thereto is about 14 to 6.

7. Apparatus according to claim 2 wherein the upper end of said piston is of slightly smaller diameter than the inside diameter of said piston housing and is guided in its sliding motion by the side walls of said piston housing, said piston being of lesser diameter at the lower end to accommodate said recoil spring which encircles the lower portion of said piston, said recoil spring being guided on the inner periphery of said piston housing.

8. Apparatus according to claim 2 wherein a piston guide sleeve is affixed to said piston, said piston guide sleeve being adapted to guide said piston in its sliding motion within said piston housing and being also adapted to mount one end of said recoil spring on said piston.

9. Apparatus according to claim 2 wherein said guide head is tapered to the point at which said impact bar protrudes whereby vision of the contact point of said impact bar and the object to be struck is facilitated.

10. A pneumatic impact tool comprising a pressure chamber; means for introducing air into said pressure chamber, a piston housing communicating with said pressure chamber; a piston slidably mounted in said piston housing; said piston having a longitudinal aperture extending therethrough; means for controlling air flow from said pressure chamber to said piston housing; an impact pin extending from a position proximate to said means for controlling air flow through said aperture in said piston; means for closing the end of said piston housing opposite of said means for controlling air flow; said means for closing the end of said piston being adapted to permit the impact pin to slide therethrough; means on said impact pin for transferring the momentum of said piston in its power stroke to said impact pin; elastic means for applying a force which tends to hold said means for controlling air flow in a closed position; elastic means for applying a force which tends to hold said means for controlling air in an open position, said elastic means being proximate to said means for controlling air flow and responsive to the motion of said impact pin; and elastic means positioned between said piston and said means for closing the end of said piston housing, said elastic means being adapted to urge said piston to its normal starting position after each power stroke.

11. A pneumatic impact tool comprising a piston housing, a pressure chamber communicating with said piston housing; means for introducing air into said pressure chamber; a piston slidably mounted in said piston housing; means for controlling air flow from said pressure chamber to said piston housing; an impact pin extending from a position proximate to, but separable from, said means for controlling air flow, said impact pin extending through an aperture in said piston and through said piston housing; means for closing the end of said piston housing opposite of said means for controlling air flow, said means for closing the end of said piston being adapted to permit the impact pin to slide therethrough; means on said impact pin for transferring the momentum of said piston in its power stroke to said impact pin; elastic means for applying a force which tends to hold said means for controlling air flow in a closed position; and elastic means positioned between said piston and said means for closing the end of said piston housing, said elastic means being adapted to urge said piston to its normal starting position after each power stroke.

12. In a pneumatic impact tool having a piston slidably mounted in a piston housing, said piston having a longitudinal aperture extending therethrough, a trigger mechanism comprising an air inlet valve adapted to control the passage of air to the area within said piston housing at the head of said piston, an air inlet valve spring adapted to apply a force which tends to hold said air inlet valve in closed position, an impact bar extending from a position near the face of said air inlet valve through said aperture in said piston along the longitudinal axis of the piston and through and to the outside of said piston housing whereby force is transmitted to said air inlet valve when the opposite end of said impact bar is jolted against an object and thereby is moved in said piston housing toward said air inlet valve, a trigger shoulder on said impact bar near said air inlet valve, a trigger spring positioned between the face of said air inlet valve and said trigger shoulder, said trigger spring being adapted to apply force tending to open said air inlet valve when said impact bar and said trigger shoulder are moved toward said air inlet valve, and an inlet valve guide and inlet valve spring mount positioned at the end of said piston housing which is provided with said inlet valve.

13. Apparatus according to claim 12 above wherein said trigger spring shoulder is removably mounted on said impact bar.

14. In a pneumatic impact tool having a piston slidably mounted in a piston housing on an impact bar wherein said pneumatic impact tool is powered by air under pressure and wherein said piston has an aperture extending therethrough along its longitudinal axis, a trigger mechanism comprising a means for controlling air flow from a source of air under pressure to an area at the head of said piston; means for mounting said means for controlling air flow between said source of air under pressure and said piston; elastic means tending to urge said means for controlling air flow to a closed position, said elastic means being mounted on that side of said means for controlling air which communicates with said source of air under pressure; an impact pin extending from a position proximate to said means for controlling air flow longitudinally through said piston and said piston housing and beyond said piston housing whereby force transmitted to the external portion of said impact pin is transmitted through said impact pin to said means for controlling air flow; and elastic means mounted on said impact pin tending to urge said means for controlling air flow to an open position, said elastic means being responsive to the motion of said impact bar and thereby upon motion of said impact bar towards said means for controlling air flow moving said means for controlling air flow to an open position.

15. In a pneumatic impact tool having a piston slidably mounted in a piston housing on an impact pin wherein said pneumatic impact tool is powered by air under pressure, a trigger mechanism comprising a means for controlling air flow from a source of air under pressure to an area at the head of said piston; means for mounting said means for controlling air flow between said source of air under pressure and said piston; elastic means tending to urge said means for controlling air flow to a closed position; an impact pin extending from a position proximate to said means for controlling air flow longitudinally through said piston and said piston housing and beyond said piston housing whereby force transmitted to the external portion of said impact pin is transmitted through said impact pin to said means for controlling air flow; and elastic means mounted on said impact pin tending to urge said means for controlling air flow to an open position, said elastic means being responsive to the motion of said impact bar and thereby upon motion of said impact bar towards said means for controlling air flow moving said means for controlling air flow to an open position.

16. In an impact tool having a piston slidably mounted in a piston housing on an impact bar, wherein said impact tool is powered by air under pressure and wherein said piston has an aperture extending therethrough along its longitudinal axis, a trigger mechanism comprising a means for controlling air flow from a source of air under pressure to a space at the head of said piston; means for mounting said means for controlling air flow between said source of air under pressure and said piston; elastic means tending to urge said means for controlling air flow to a closed position; means for transmitting force imparted to said impact bar longitudinally through said aperture in said piston to said means for controlling air flow whereby said means for controlling air flow can be jolted slightly open whereupon said means for controlling air flow is fully opened in response to air pressure from the source of air under pressure.

17. A pneumatic impact tool comprising a piston housing, a pressure chamber communicating with said piston housing, a piston slidably mounted in said piston housing; a lower inlet valve seat at one end of said piston housing communicating with said pressure chamber; a cup-shaped lower inlet valve having a hollow stem, the hollow within said stem extending from the face of said valve through the entire valve stem, said lower inlet valve seat being adapted to seat said cup-shaped lower inlet valve and having perforations in the side walls thereof extending from the interior of said valve seat through said valve seat to said pressure chamber, said perforations being adapted to permit the flow of air from said pressure chamber to said piston housing when said lower inlet valve is in an open position, the side walls of said cup-shaped lower inlet valve sealing said perforations when said cup-shaped lower inlet valve is in the closed position, said cup-shaped lower inlet valve being perforated in the lower portion thereof to freely permit the flow of air from the area above said lower inlet valve to the area below said inlet valve; an upper inlet valve seat completely enclosing the area above said lower inlet valve, said upper valve seat being mounted upon said lower valve seat whereby the two valve seats form an enclosed area between said piston housing and said upper valve seat; an upper inlet valve adapted to control the flow of air from said pressure chamber through said upper valve seat to the area below said upper valve seat; an upper valve stem guide assembly; an upper valve spring adapted to apply a force tending to maintain said upper valve in the closed position; a lower valve spring positioned by said lower valve stem between the lower face of said upper inlet valve and the upper face of said lower inlet valve, said lower valve spring being adapted to apply a force tending to maintain said lower inlet valve in the closed position; a guide head closing the end of said piston housing opposite said lower inlet valve seat, said piston housing being provided with apertures whereby air entrapped in said piston housing before said piston in its forward power stroke is exhausted and being provided also with apertures in said piston housing whereby air driving said piston in its power stroke is exhausted after the power stroke is completed; an impact bar extending from a position below the face of said lower air inlet valve through an aperture in said piston along the longitudinal axis of said piston and through and to the outside of said guide head whereby force is transmitted toward said lower inlet valve when the opposite head of said impact bar is jolted against an object and is thereby moved in said piston housing towards said air inlet valve, said impact bar being positioned within said piston housing by means of said guide head and said piston, said piston being slidably mounted on said impact bar within said piston housing; a shoulder positioned in line with said impact pin immediately below said lower inlet valve, said shoulder being adapted to impact a force to said lower inlet valve when said impact bar is moved towards said lower air inlet valve and adapted also to receive the impact pin extension; an impact pin extension extending from the lower face of said upper inlet valve through the hollow stem of said lower inlet valve to said shoulder, said pin extension being adapted to transmit force to said upper air inlet valve when said impact pin is jolted against an object; an impact shoulder on said impact bar between said piston and said guide head, said impact shoulder being adapted to be struck by said piston in its power stroke and thereby to transfer the momentum of said piston to said impact bar and a recoil spring positioned between said piston and said guide head so as to be compressed on the power stroke of said piston, said recoil spring being adapted to urge said piston to its normal starting position after its power stroke.

18. An impact tool powered by fluids under pressure comprising a piston housing; a pressure chamber communicating with said piston housing; means for controlling fluid flow from said pressure chamber to said piston housing, said means being mounted between said pressure chamber and said piston housing; means tending to urge said means for controlling fluid flow to a closed position; a piston slidably mounted in said piston housing; a member making contact with said means for controlling fluid flow and extending through said piston housing; means for transmitting the impetus of said piston in ts power stroke to said member; said member being both a means of moving said means for controlling fluid flow from said pressure chamber to said piston housing to an open position and a means of delivering the impetus of said piston to an object.

19. An impact tool according to claim 18 wherein said means for controlling fluid flow comprises an upper valve; a lower valve; means for coordinating the opening and closing of said valves; means for mounting said upper and lower valves between said pressure chamber and said piston housing, said means having valve seats adapted to receive each of said valves, said means for mounting said upper and lower valves enclosing a space between said valves which is in open and direct communication with said pressure chamber; said lower valve being situated between said piston housing and said space between said upper and lower valves; means for enclosing an upper fluid space over said upper valve on the side of said upper valve opposite said space between said upper and lower valves; means providing for fluid passage between said upper fluid space and said piston housing, and means for urging said valves to a closed position.

20. A pneumatic impact tool comprising a piston housing; a pressure chamber communicating with said piston housing; the volume of said pressure chamber being greater than the volume of said piston housing; means for controlling air flow from said pressure chamber to a space at the head of said piston housing, said means being mounted between said pressure chamber and said piston housing; means tending to urge said means for controlling air flow to a closed position; a piston slidably mounted in said piston housing; an impact pin making contact with said means for controlling air flow and extending through said piston housing; means for transmitting the impetus of said piston in its power stroke to said impact pin; said impact pin being both a means for moving said means for controlling air flow from said pressure chamber to said piston housing to an open position and a means for delivering the impetus of said piston to an object.

21. In a pneumatic impact tool having a piston slidably mounted in a piston housing, wherein said pneumatic impact tool is powered by air under pressure, a trigger mechanism comprising a means for controlling air flow from a source of air under pressure to an area at the head of said piston; means for mounting said means for controlling air flow between said source of air under pressure and said area at the head of said piston; elastic means tending to urge said means for controlling air flow to a closed position; and an impact pin extending from a position proximate to and separable from said means for controlling air flow longitudinally through said piston and said piston housing and beyond said piston housing, whereby force transmitted to the external portion of said impact pin is transmitted by said impact pin to said means for controlling air flow.

22. A pneumatic impact tool comprising a piston housing, a pressure chamber communicating with said piston housing; a piston slidably mounted in said piston housing; means for controlling air flow from said pressure chamber to a space at the head of said piston housing; an impact pin extending from a position proximate to said means for controlling air flow through an aperture in said piston through said piston housing; means for closing the end of said piston housing opposite to said means for controlling air flow, said means for closing the end of said piston being adapted to permit the impact pin to slide therethrough; means on said impact pin for transferring the momentum of said piston in its power stroke to said impact pin; elastic means for applying a force which tends to hold said means for controlling air flow in a closed position; and elastic means positioned between said piston and said means for closing the end of said piston housing, said second named elastic means being adapted to urge said piston to its normal starting position after each power stroke.

23. A valve assembly adapted to control the flow of air between a source of air under pressure and an air receiving space comprising an upper valve, a lower valve, said valves having a common valve stem to which each of said valves is fixed whereby said upper and lower valves can be moved in unison, means for mounting said upper and lower valves between a source of air under pressure and an air receiving space, said means having valve seats adapted to receive each of said valves, said means for mounting said upper and lower valves enclosing a space between said valves which is in open and direct communication with said source of air under pressure, said lower valve being situated between said air receiving space and said space between said upper and said lower valves, means for enclosing an upper air space over said upper valve on the side of said upper valve opposite said space between said upper and lower valves, means providing for free and rapid air passage between said upper space and said air receiving space, and means for urging said valves to a closed position.

24. A valve assembly adapted to control the flow of fluids between a source of fluid under pressure and a fluid receiving space comprising an upper valve, a lower valve, means for coordinating the opening and closing of said valves, means for mounting said upper and lower valves between a source of fluid under pressure and a fluid receiving space, said means having valve seats adapted to receive each of said valves, said means for mounting said upper and lower valves enclosing a space between said valves which is in open and direct communication with said source of fluid under pressure, said lower valve being situated between said fluid receiving space and said space between said upper and lower valve, means for enclosing an upper fluid space over said upper valve on the side of said upper valve opposite said space between said upper and lower valves, means providing for free and rapid fluid passage between said upper space and said fluid receiving space, and means for urging said valves to a closed position.

25. A pneumatic impact tool comprising a pressure chamber; a piston housing communicating with said pressure chamber; a piston slidably mounted in said piston housing; said piston having a longitudinal aperture extending therethrough; means for controlling air flow from said pressure chamber to said piston housing; an impact pin extending from a position proximate to said means for controlling air flow through said aperture in said piston; means for closing the end of said piston housing opposite to said means for controlling air flow; said means for closing the end of said piston housing being adapted to permit the impact pin to slide therethrough; means on said impact pin for transferring the momentum of said piston in its power stroke to said impact pin; elastic means for applying a force which tends to hold said means for controlling air flow in a closed position; elastic means for applying a force which tends to hold said means for controlling air in an open position, said second named elastic means being proximate to said means for controlling air flow and responsive to the motion of said impact pin; and elastic means positioned between said piston and said means for closing the end of said piston housing, said last named elastic means being adapted to urge said piston to its normal starting position after each power stroke.

26. In a pneumatic tool, a valve mechanism for controlling the flow of air from a source of air under pressure comprising a lower valve seat having lateral perforations in the side walls thereof extending from the interior of said lower valve seat to the air under pressure; a cup-shaped lower valve having perforations in the lower portion thereof, whereby air may freely flow from the area above said lower valve to the area below said lower valve, the side walls of said lower valve being adapted to seal the perforations in the side walls of said lower valve seat when said lower valve is in the closed position and being adapted also to permit the flow of air through said perforations in the side walls of said lower valve seat to the space below said lower valve when said lower valve is in the open position, said lower valve also having a centrally disposed hollow cylindrical valve stem; an upper valve seat enclosing a space above said lower valve and within said lower valve seat; an upper valve adapted to control the flow of air from said source of air under pressure to the area above said lower valve and below said upper valve seat, said upper valve having a lower extension extending downwardly through said hollow cylindrical valve stem of said lower valve and having also an upper valve stem extending upwardly from said upper valve; an upper valve stem guide assembly mounted upon said upper valve seat; an elastic means tending to urge said upper valve to a closed position; and elastic means positioned between the upper face of said lower valve and the lower face of said upper valve, said second named elastic means being placed around said hollow cylindrical valve stem and being also adapted to apply a force tending to urge said lower valve to a closed position when said upper valve is moved toward a closed position.

27. A pneumatic impact tool comprising a pressure chamber, a piston housing communicating with said pressure chamber, a piston slidably mounted within said piston housing, said piston having an aperture extending longitudinally therethrough, an air inlet valve seat at the end of said piston housing which communicates with said pressure chamber, an air inlet valve between said pressure chamber and said piston housing, said air inlet valve being adapted to fit into said air inlet valve seat and thereby control the air flow between said pressure chamber and said piston housing, a guide head closing the end of said piston housing opposite said air inlet valve seat, said piston housing being provided with apertures whereby air entrapped in said piston housing before said piston in its forward power stroke is exhausted and being provided also with apertures in said piston housing whereby air driving said piston in its power stroke is exhausted after the power stroke is completed, an impact bar extending from a position adjacent to the face of said air inlet valve through said aperture in said piston along the longitudinal axis of said piston and through and to the outside of said guide head, whereby force is transmitted to said air inlet valve when the opposite end of said impact bar is bolted against an object and thereby is moved in said piston housing toward said air inlet valve, said impact bar being positioned within said piston housing by means of said guide head and said piston, said piston being slidably mounted on said impact bar within said piston housing, an impact shoulder on said impact bar, said impact shoulder being adapted to be struck by said piston in its power stroke and thereby to transfer the momentum of said piston to said impact bar, a trigger shoulder mounted on said impact bar near said air inlet valve, a trigger spring positioned between the face of said air inlet valve and said trigger shoulder, said trigger spring being adapted to apply force tending to open said air inlet valve when said impact bar and said trigger shoulder are moved toward said air inlet valve, an air inlet valve spring adapted to apply force which tends to hold said air inlet valve in closed position, and a recoil spring positioned between said piston and said guide head so as to be compressed on the power stroke of said piston, said recoil spring being adapted to urge said piston to its normal starting position after its power stroke.

28. An impact tool comprising a cylinder, a chamber communicating with said cylinder and adapted to contain fluids under pressure; control means for controlling fluid flow from said chamber to said cylinder, said control means being positioned between said chamber and said cylinder; means for urging said control means to a closed position; a piston slidably mounted in said cylinder; impact means responsive to the movement of said piston for transmitting the impetus of said piston to an object desired to be struck, said impact means being proximate to and separable from said control means, and said impact means being both a means for moving said control means to an open position and a means of transmitting the impetus of said piston to an object.

29. An impact tool comprising a cylinder, a chamber communicating with said cylinder and adapted to contain fluids under pressure; control means for controlling fluid flow from said chamber to said cylinder, said control means being positioned between said chamber and said cylinder; means for urging said control means to a closed position; a piston slidably mounted in said cylinder; impact means responsive to the movement of said piston for transmitting the impetus of said piston to an object desired to be struck; and means for moving said control means to an open position, said last named means being mounted within said cylinder and subject to the action of said piston in its power stroke and being independent of said impact means.

30. An impact tool according to claim 29 wherein said means for moving said control means to an open position comprises a member slidably mounted within the lower portion of said cylinder and proximate to said impact means, and a rod-like member extending from a position proximate to said means for controlling fluid flow longitudinally through said piston to said slidable member, whereby a force applied to the external position of said slidable member is transmitted by said rod member to said control means.

31. An impact tool according to claim 29 wherein said control means comprises a valve member, means for mounting said valve member between said chamber and said cylinder, said means having a valve seat adapted to receive said valve member, said means forming an enclosed area above said valve member, a restricted passage between said chamber and said area through which fluid from said chamber may pass into said area to build pressure against said valve member to lock said member in a closed position, means for rapidly reducing the fluid pressure within said enclosed area prior to opening said valve member, and means for urging said valve member to a closed position.

32. An impact tool according to claim 29 wherein said control means comprises a main valve member, a housing for mounting said valve member between said chamber and said cylinder, said housing having a valve seat adapted to receive said valve member, said housing forming an enclosed area above said valve member, a restricted passage between said chamber and said enclosed area whereby fluid from said chamber may pass to said area to build pressure against said valve member locking said valve in a closed position, a relief valve between said enclosed area and said cylinder of smaller diameter than said main valve member for rapidly reducing the fluid pressure within said enclosed area prior to opening said main valve, and means for urging said valves to a closed position.

33. An impact tool comprising a cylinder, a chamber communicating with said cylinder and adapted to contain fluids under pressure, a valve member, means for mounting said valve member between said chamber and said cylinder, said means having a valve seat adapted to receive said valve member, said means forming an enclosed area above said valve member, a restricted passage between said chamber and said enclosed area through which fluid from said chamber may pass into said area to exert pressure against said valve member to lock said valve in a closed position, means for rapidly reducing the fluid pressure within said enclosed area prior to opening said valve, means for urging said valve to a closed position, a piston slidably mounted within said cylinder, impact means responsive to the movement of said piston for transmitting the impetus of said piston to an object desired to be struck, a member slidably mounted within the lower portion of said cylinder and proximate to said impact means, and a rod-like member extending from a position proximate to said valve member longitudinally through said piston to said slidable member, whereby a force applied to the external portion of said slidable member is transmitted by said rod member to said valve member.

34. An impact tool comprising a cylinder, a chamber communicating with said cylinder and adapted to contain fluids under pressure, a main valve member, a valve housing for mounting said valve member between said chamber and said cylinder, said housing having a valve seat adapted to receive said valve member, said housing forming an enclosed area above said valve member, a restricted passage between said chamber and said enclosed area whereby fluid from said chamber may pass into said area to build pressure against said valve member locking said member in a closed position, a relief valve between said enclosed area and said cylinder of smaller diameter than said main valve member for rapidly reducing the fluid pressure within said enclosed area prior to opening said main valve, means for urging said valves to a closed position, a piston slidably mounted in said cylinder, an impact bar integral with said piston for transmitting the impetus of said piston to an object desired to be struck, a member slidably mounted within the lower end portion of said cylinder and about said impact bar, and a rod-like member extending from a position proximate to said valve member longitudinally through said piston to said slidable member, whereby a force applied to the external portion of said slidable member is transmitted by said rod member to said valve member.

35. A valve assembly adapted to control the flow of fluid between a source of fluid under pressure and a fluid receiving space comprising a valve member, means for mounting said valve member between said fluid receiving space, said mounting means having a valve seat adapted to receive said valve member, said mounting means forming an enclosed area above said valve member, a restricted passage between said fluid source and said chamber through which fluid from said source may pass into said chamber to build pressure against said valve member to lock said valve in a closed position, means for rapidly reducing the fluid pressure within said chamber prior to opening said valve, and means for urging said valve member to a closed position.

36. A valve assembly adapted to control the flow of fluid between a source of fluid under pressure and a fluid receiving space comprising a main valve member, a valve housing for mounting said valve member between said fluid source and said fluid receiving space, said housing having a valve seat adapted to receive said valve member, said housing forming an enclosed area above said valve member, a restricted passage between said fluid source and said enclosed area whereby fluid from said source may pass into said area to build pressure against said valve member locking said member in a closed position, a relief valve between said enclosed area and said fluid receiving space of smaller diameter than said valve member for rapidly reducing the fluid pressure within said chamber prior to opening said main valve, and means for urging said valves to a closed position.

37. A valve assembly adapted to control the flow of fluid between a source of fluid under pressure and a fluid receiving space comprising a main valve member, means for mounting said main valve member between said fluid source and said fluid receiving space, said mounting means having a valve seat adapted to receive said valve member, said mounting means forming an enclosed area above said valve member, a restricted passage between said fluid source and said chamber through which fluid from said source may pass into said enclosed area to build pressure against said valve member locking said valve member in a closed position, a valve guide assembly mounted within said main valve, a relief valve slidably mounted within said guide assembly, said main valve member having a valve seat for receiving said relief valve, means for opening said relief valve prior to the opening of said main valve thereby reducing the fluid pressure within said enclosed area, and elastic means for urging said valves to a closed position.

38. In an impact tool having a piston slidably mounted in a cylinder with impact means responsive to the movement of said piston, wherein said impact tool is powered by fluid under pressure and wherein said piston has an aperture extending therethrough along it longitudinal axis; a trigger mechanism comprising a means for controlling fluid flow from a source of fluid under pressure to a space at the head of said piston, means for mounting said means for controlling fluid flow between said source of fluid under pressure and said space at the head of said piston, means tending to urge said means for controlling fluid flow to a closed position, a member slidably mounted within the lower portion of said cylinder and proximate to said impact means, and a rod-like member extending from a position proximate to said means for controlling fluid flow longitudinally through said piston to said slidable member, whereby a force applied to the external portion of slidable member will be transmitted to said means for controlling fluid flow.

39. An impact tool comprising a chamber adapted to contain fluid under pressure, a cylinder communicating with said chamber, a piston slidably mounted within said cylinder, said piston having an aperture extending longitudinally therethrough, an air inlet valve seat at one end of said cylinder which communicates with said chamber, an air inlet valve between said chamber and said cylinder, said air inlet valve being adapted to fit over said air inlet valve seat and thereby control the fluid flow between said chamber and said cylinder, a guide head closing the end of said cylinder opposite said air inlet valve seat, said cylinder being provided with apertures whereby air entrapped in said cylinder before said piston in its forward power stroke is exhausted and being provided also with apertures in said cylinder whereby air driving said piston in its power stroke is exhausted after the power stroke is completed, an impact bar extending from said piston to the lower portion of said cylinder, said impact bar being attached to said piston and responsive to the movement of said piston, a hollow tube slidably mounted within said guide head and surrounding said impact bar, the upper end portion of said tube having a generally spool-shaped configuration, a rod extending from a position proximate to said air inlet valve longitudinally through said piston to the upper end of said tube, whereby force applied to the external portion of said tube is transmitted by said rod to said air inlet valve, elastic means adapted to apply force which tends to urge said air inlet valve to a closed position, and a recycling spring positioned between said piston and said guide head so as to be compressed on the power stroke of said piston, said recycling spring being adapted to urge said piston to its normal starting position after the completion of its power stroke.

40. An impact tool comprising a chamber adapted to contain fluid under pressure, a cylinder communicating with said chamber, a piston slidably mounted within said cylinder, said piston having an aperture extending longitudinally therethrough, a main valve member, a valve housing for mounting said valve member between said chamber and said cylinder, said housing having a valve seat adapted to receive said main valve member, said housing forming an enclosed area above said valve member, a restricted passage between said chamber and said enclosed area whereby fluid from said chamber may pass into said area to build pressure against said valve member locking said member in a closed position, a valve guide assembly mounted within said main valve, a relief valve slidably mounted within said guide assembly, said main valve member having a valve seat for opening said relief valve prior to the opening of said main valve thereby reducing the fluid pressure within said enclosed area, elastic means for urging said valves to a closed position, a guide head closing the end of said cylinder opposite said main valve member, said cylinder being provided with apertures whereby air entrapped in said cylinder before said piston in its forward power stroke is exhausted and being provided also with apertures in said cylinder whereby air driving said piston in its power stroke is exhausted after the power stroke is completed, an impact bar extending from said piston to the lower portion of said cylinder, said impact bar being attached to said piston and responsive to the movement of said piston, a hollow tube slidably mounted within said guide head and surrounding said impact bar, the upper end portion of said tube having a generally spool-shaped configuration, a rod extending from a position proximate to said main valve member longitudinally through said piston to the upper end of said tube, whereby force applied to the external portion of said tube is transmitted by said trigger rod to said main valve member, a recycling spring positioned between said piston and said guide head so as to be compressed on the power stroke of said piston, said recycling spring being adapted to urge said piston to its normal starting position after the completion of its power stroke, and impact absorbing means mounted about said hollow tube for absorbing part of the impact delivered to said tube on the forward movement of said piston.

41. A pneumatic impact tool comprising a piston housing; a pressure chamber communicating with said piston housing; means for controlling air flow from said pressure chamber to said piston housing, said means comprising an upper valve; a lower valve; means for coordinating the opening and closing of said valve; means for mounting said upper and lower valves between said pressure chamber and said piston housing, said means having valve seats adapted to receive each of said valves, said means for mounting said upper and lower valves enclosing a space between said valves which is in open and direct communication with said pressure chamber, said lower valve being situated between said piston housing and said space between said upper and lower valves; means for enclosing an upper air space over said upper valve on the side of said upper valve opposite said space between said upper and lower valves, means for providing free and rapid air passage between said upper space and said piston housing, means for urging said valves to a closed position; a piston slidably mounted in said piston housing; an impact pin making contact with said means for controlling air flow and extending through said piston housing; means for transmitting the impetus of said piston in its power stroke to said impact pin; said impact pin being both a means for moving said means for controlling air flow from said pressure chamber to said piston housing to an open position and a means for delivering the impetus of said piston to an object.

42. A pneumatic impact tool comprising a piston housing; a pressure chamber communicating with said piston housing; means for controlling air flow from said pressure chamber to said piston housing, said means comprising an upper valve; a lower valve; said valves having a common valve stem to which of said valves is fixed; means for mounting said upper and lower valves between said pressure chamber and said piston housing, said means having valve seats adapted to receive each of said valves, said means for mounting said upper and lower valves enclosing a space between said valves which is in open and direct communication with said pressure chamber, said lower valve being situated between said piston housing and said space between said upper and lower valves; means for enclosing an upper air space over said upper valve on the side of said upper valve opposite said space between said upper and lower valves, means for providing for free and rapid air passage between said upper space and said piston housing, means for urging said valves to a closed position; a piston slidably mounted in said piston housing; an impact pin making contact with said means for controlling air flow and extending through said piston housing; means for transmitting the impetus of said piston in its power stroke to said impact pin; said impact pin being both a means for moving said means for controlling air flow from said pressure chamber to said piston housing to an open position and a means for delivering the impetus of said piston to an object.

43. A pneumatic impact tool comprising a piston housing, a pressure chamber communicating with said piston housing; a piston slidably mounted in said piston housing; means for controlling air flow from said pressure chamber to said piston housing; said means comprising an upper valve; a lower valve; said valves having a common valve stem to which each of said valves is fixed; means for mounting said upper and lower valves between said pressure chamber and said piston housing, said means having valve seats adapted to receive each of said valves, said means for mounting said upper and lower valves closing a space between said valves which is in open and direct communication with said pressure chamber, said lower valve being situated between said piston housing and said space between said upper and lower valves; means for enclosing an upper air space over said upper valve on the side of said upper valve opposite said space between said upper and lower valves, means providing for free and rapid air passage between said upper space and said piston housing, and means for urging said valves to a closed position; an impact pin extending from a position proximate to said means for controlling air flow through an aperture in said piston through said piston housing; means for closing the end of said piston housing opposite to said means for controlling air flow, said means for closing the end of said piston being adapted to permit the impact pin to slide therethrough; means on said impact pin for transferring the momentum of said piston in its power stroke to said impact pin; elastic means for applying a force which tends to hold said means for controlling air flow in a closed position; and elastic means positioned between said piston and said means for closing the end of said piston housing, said second named elastic means being adapted to urge said piston to its normal starting position after each power stroke.

44. In a portable pneumatic tool, the combination of a piston housing; a piston slidably mounted for end-wise motion in said piston housing; a pressure chamber communicating with said piston housing and adapted to contain fluid under pressure at all times during the operation of said pneumatic tool; means for controlling the flow of air from said pressure chamber into said piston housing; and means associated with said piston and within said piston housing for moving said means for controlling air flow to an open position; said piston and said piston housing and said means for controlling air flow defining a space which varies in volume as said piston is moved within said piston housing, said pressure chamber being of greater volume than the maximum volume of said space whereby the loss of air in said pressure chamber which occurs on the opening of said means for controlling air does not reduce the air pressure in said pressure chamber below that required to effectively operate said piston, said tool being triggered by the impact of said means associated with said piston and with the object desired to be struck.

References Cited by the Examiner

UNITED STATES PATENTS

| | | | |
|---|---|---|---|
| 551,473 | 12/1895 | Perkins | 137—613 |
| 1,264,318 | 4/1918 | McGarth | 173—136 |
| 1,333,267 | 3/1920 | Mapel | 137—613 |
| 1,584,799 | 5/1926 | Page | 173—18 |
| 1,698,783 | 1/1929 | Ditson | 173—137 |
| 2,668,518 | 2/1954 | White | 173—121 |
| 2,807,021 | 9/1957 | Chellis | 173—15 |
| 2,872,901 | 2/1959 | Goldring et al. | 91—417 |

FRED C. MATTERN, JR., *Primary Examiner.*

L. P. KESSLER, *Assistant Examiner.*